United States Patent [19]

Aotani

[11] 4,251,101
[45] Feb. 17, 1981

[54] MOLDING HOLDER FOR A WINDSHIELD OF A MOTOR VEHICLE

[75] Inventor: Shigeo Aotani, Fujisawa, Japan

[73] Assignee: Kato Hatsujo Company Limited, Yokohama, Japan

[21] Appl. No.: 57,036

[22] Filed: Jul. 12, 1979

[51] Int. Cl.³ .............................................. B60J 1/02
[52] U.S. Cl. ........................................ 296/93; 52/208
[58] Field of Search ..................... 296/93; 52/208, 718

[56] References Cited

U.S. PATENT DOCUMENTS

| 3,155,422 | 11/1964 | Campbell | 296/93 |
| 3,241,277 | 3/1966 | Coppock | 296/93 |
| 3,338,007 | 8/1967 | Draplin | 52/208 |
| 3,925,947 | 12/1975 | Meyers | 52/208 |

Primary Examiner—Robert R. Song
Attorney, Agent, or Firm—Koda and Androlia

[57] ABSTRACT

A molding holder for a motor vehicle which includes two molding holder members. Each of the two molding holder members includes a fixed base to be coupled to a body panel, a clasp extending from an edge of said fixed base having a lengthwise groove in the inner side thereof and a guide extending from another edge of the fixed base. The two members are coupled together by a joint to form a large molding holder.

2 Claims, 4 Drawing Figures

MOLDING HOLDER FOR A WINDSHIELD OF A MOTOR VEHICLE

BACKGROUND OF THE INVENTION

1. Field of the Invention

This invention relates to a holder that fastens the molding used as decoration on the periphery of an automobile windshield, and more particularly to a holder that is fastened into the space between the car body and the windshield in order to lock and anchor the molding that preserves the external appearance following adhesion of the windshield.

2. Prior Art

The molding is installed on the periphery of the automobile windshield not only for decoration, but also for waterproofing and dustproofing. Regarding this molding, conventionally (U.S. Pat. No. 3,155,422) a leaf spring-bearing fastener is anchored in a part of the body, and the molding is anchored by locking it to the tip of the fastener. Also, in the process of U.S. Pat. No. 3,673,300, T studs are welded to the body at fixed intervals, and the molding is installed using fasteners (e.g., the metallic fastener described in U.S. Pat. No. 3,670,368, or the resinous fastener described in U.S. Pat. No. 3,555,629, Japan Utility Model 48-5391, etc.). The fasteners have keyhole slots, and the fasteners are anchored by inserting and sliding the heads of the T studs into these keyhole slots. After this anchoring, the molding is installed by connecting the edge of the molding to the fasteners.

However, in the aforementioned processes, not only are the T studs slanted by welding and the weld height and spacing are irregular, but much time and trouble are required, and the process is unsuitable for mass production. Moreover, sputter adheres to the welded part during T stud welding, so it is difficult for the paint to adhere, and rust develops in the region of the weld around metallic fasteners. A decreased market value frequently results due to the spread of this rust.

In an attempt to solve the above problem the Assignee Company of this invention has developed a molding holder for an automobile windshield comprising, as a single unit, a fixed base adhered to the body panel, a clasp extending from one end of the fixed base in parallel with said base, a base extending from the other end of the fixed base, a molding connector formed in the inside of the clasp on the fixed base, whereby the molding is held and fastened by locking its edge into the molding connector by inserting it with pressure between the fixed base and the clasp. This molding holder is lengthy, since it is applied along the front glass of the automobile.

This molding process is generally determined in terms of the material and the configuration of the product. The extrusion molding is suited for a product having rather a long and simple configuration and requring no precision. As to the material, the extrusion moldng is suited for vinyl chrolide, polyethylene and the like that has high viscosity. On the other hand, the injection molding is suited for manufacturing a product rather small but precise made of a material with a low viscosity.

Since the molding holder of this invention has such a structure that holds a molding inserted between the fixed base and the clasp, the material has to be elastic and the configuration has to be precise. Therefore, the injection molding should be used as the molding process for manufacturing the molding holder of this invention. However, as mentioned above, the injection molding is limited in the size of the product. This caused a practical problem, as the molding has a considerable length to fully cover the front glass.

SUMMARY OF THE INVENTION

Accordingly, it is the primary object of this invention to provide a molding holder which has an efficient function and still can be made by the injection molding process.

DETAILED DESCRIPTION OF THE INVENTION

Figure 1:
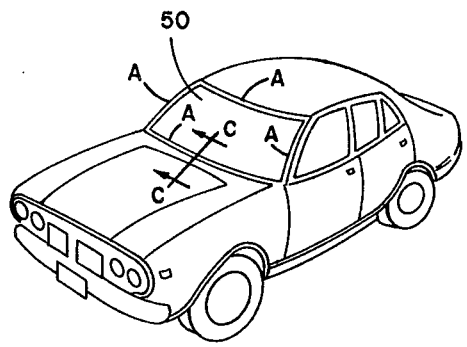
FIG. 1 shows a perspective view of the molding holder of this invention attached to an automobile.

Here is given an explanation of embodiments of the molding holder of this invention referring to the drawings.

FIG. 1 shows a perspective view of an automobile for illustrating the molding holder attached to the automobile, where the molding holder, as indicated by the reference A, is disposed around the windshield glass for the prevention of dust and the decoration.

Figure 2:
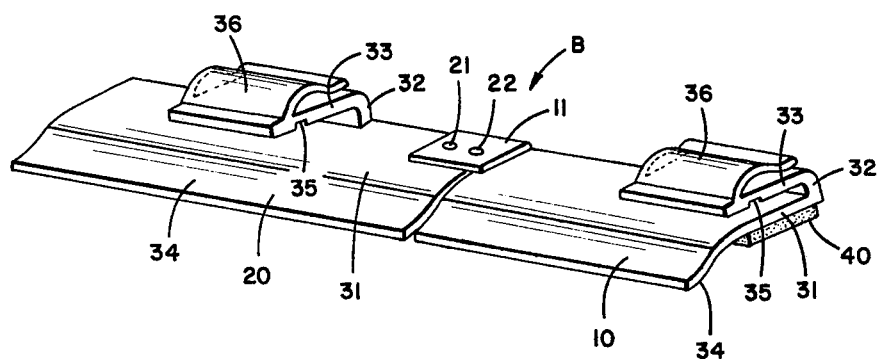
FIG. 2 shows a perspective view of the molding holder of this invention.

FIG. 2 shows a perspective view of the molding holder of this invention. The molding holder comprises separate molding holder units 10 and 20 connected to each other to form a lengthy molding holder. These two units 10 and 20 have the same structure except the joint points B. More specifically, the molding holder comprises a fixed base 31 to be adhered to the body panel of the automobile, a clasp 33 connected to one end of the fixed base 31 with a connecting part 32, said clasp 33 having a lengthwise groove 35 in the inner side of the clasp 33, a guide plate 34 extending from the fixed base 31, said guide plate 34 being thinner than the fixed base 31. and a leaf spring 36 extending from and above the clasp 33. These elements are made of plastic resin to form a single unit. The bottom 34 of the molding holder is given a curve to fit the body panel.

Figure 3:
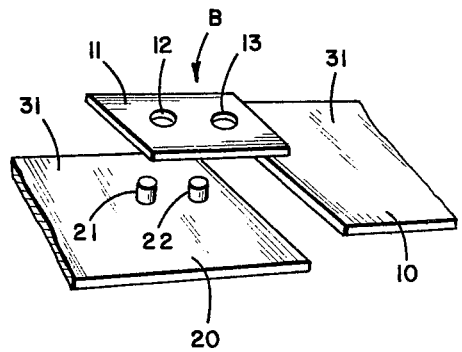
FIG. 3 shows an enlarged view of the joint of the molding holder of this invention.

Now referring to FIG. 3 showing an enlarged jointing point B. The molding holder unit 10 has a plate 11 thereon as an integral part, such that the plate 11 has holes 12 and 13 therein. The other unit 20 has projections 21 and 22 thereon to fit in the holes 12 and 13. The projections 21 and 22 are so formed as to be a little higher than the thickness of the plate 11.

Since the molding holder of this invention comprises separate units each of which is rather small, the holder may be manufactured by the injection molding process. The material for the molding holder may better be selected from thermo-plastic materials such as nylon 6 and nylon 66, since the molding holder requires elasticity. To securely joint the two units 10 and 20, the projections 21 and 22 are inserted into the holes 12 and 13 and the head portion of the projections extending over the plate 11 are crushed by a press machine to calk over the plate 11. Thus, the two separate units 10 and 20 form a single molding holder.

It is recommended that the molding holder units 10 and 20 be treated with hot water at 80°-100° C. for 20-30 minutes (i.e. annealing). This will cause the material (nylon) to absorb water and become softer. Thus, the calking on the head portion of the projections 21 and 22 gets more efficient.

The molding holder, thus obtained, is caused to have an adhesive tape with both sides being adhesive along the full length thereof.

Figure 4:
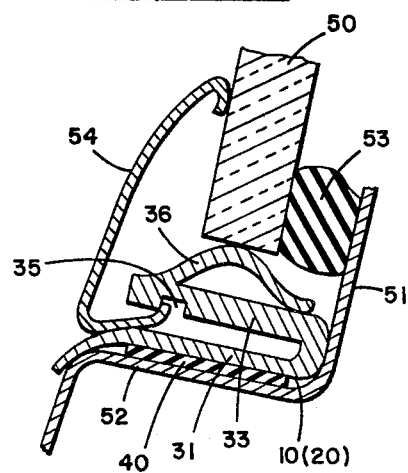
FIG. 4 shows a cross-section view taken along the line C—C of FIG. 1.

FIG. 4 shows a cross-section view of the molding holder taken along the line C—C of FIG. 1 for illustrating how all the parts work together.

First, the molding holder comprising molding holder units 10 and 20 are placed upon shoulder 52 of the body panel 51 to fit around the windshield glass 50. The units 10 and 20 are securely adhered to the body panel 51 through the adhesive tape 40.

Then, the windshield glass 50 with glue 53 at the edge thereof is pressed to the body panel 51.

Finally, the tip portion of the molding 54 is inserted between the fixed base 31 and the clasp 33. When the tip portion of the molding 54 fits in the groove 35, the molding 54 is securely held by the pressure given by the clasp 33, the fixed base 31 and the windshield glass 50. In other words, the pressure given by the clasp 33 renders the molding 54 to turn around the fulcrum at the contact point with the fixed base 31 against the windshield glass 50.

In the above embodiment, the molding holder is formed of two units 10 and 20; however, it is equally possible to be formed of three or more units.

Thus, the molding holder, which is considerably lengthy, may be produced by way of the injection molding by dividing into rather short units.

I claim:

1. A molding holder for a motor vehicle comprising:
   two members, each of said members comprising:
      a fixed base to be coupled to a body panel;
      a clasp extending from an edge of said fixed base, said clasp having a lengthwise groove in the inner side thereof of; and
      a guide extending from an upper edge of said fixed base; and
   a joint for connecting each of the two members together, whereby a complete molding holder is formed which is larger than either member singly, said joint comprising a tongue having a plurality of holes therein extending from one of said two members and a plurality of projections formed on the other of the two members to fit into said holes in said tongue.

2. A molding holder according to claim 1, wherein said molding holder further comprises a leaf spring extending from and over said clasp.

* * * * *